(12) United States Patent
Davis et al.

(10) Patent No.: US 8,595,389 B2
(45) Date of Patent: *Nov. 26, 2013

(54) DISTRIBUTED PERFORMANCE COUNTERS (75) Inventors: Kristan D. Davis, Rochester, MN (US);
Kahn C. Evans, Rochester, MN (US);
Alan Gara, Yorktown Heights, NY (US);
David L. Satterfield, Tewksbury, MA (US)

(73) Assignee: International Business Machines Corporation, Armonk, NY (US)

( * ) Notice: Subject to any disclaimer, the term of this patent is extended or adjusted under 35 U.S.C. 154(b) by 634 days.

This patent is subject to a terminal disclaimer.

(21) Appl. No.: 12/684,738

(22) Filed: Jan. 8, 2010

(65) Prior Publication Data

US 2011/0172968 A1   Jul. 14, 2011

(51) Int. Cl.
*G06F 13/00* (2006.01)
*G06F 3/00* (2006.01)
*G06F 11/00* (2006.01)

(52) U.S. Cl.
USPC ............ 710/18; 710/8; 710/15; 710/100; 712/29; 712/227; 714/30; 714/31; 714/704

(58) Field of Classification Search
None
See application file for complete search history.

(56) References Cited

U.S. PATENT DOCUMENTS

| 4,423,420 | A | * | 12/1983 | Krajewski | 342/400 |
|---|---|---|---|---|---|
| 5,297,277 | A | * | 3/1994 | Dein et al. | 714/45 |
| 5,881,223 | A | | 3/1999 | Agrawal et al. | |
| 6,480,966 | B1 | | 11/2002 | Rawson, III | |
| 6,925,424 | B2 | | 8/2005 | Jones et al. | |
| 2004/0030873 | A1 | * | 2/2004 | Park et al. | 712/245 |
| 2005/0155018 | A1 | | 7/2005 | DeWitt, Jr. et al. | |
| 2006/0224762 | A1 | * | 10/2006 | Tian et al. | 709/231 |
| 2007/0286327 | A1 | | 12/2007 | Love et al. | |
| 2008/0046700 | A1 | * | 2/2008 | Gara et al. | 712/227 |
| 2009/0271553 | A1 | * | 10/2009 | Gang et al. | 710/305 |
| 2011/0172968 | A1 | * | 7/2011 | Davis et al. | 702/186 |

* cited by examiner

*Primary Examiner* — Tanh Nguyen
(74) *Attorney, Agent, or Firm* — Scully, Scott, Murphy & Presser, P.C.; Daniel P. Morris, Esq.

(57) ABSTRACT

A plurality of first performance counter modules is coupled to a plurality of processing cores. The plurality of first performance counter modules is operable to collect performance data associated with the plurality of processing cores respectively. A plurality of second performance counter modules are coupled to a plurality of L2 cache units, and the plurality of second performance counter modules are operable to collect performance data associated with the plurality of L2 cache units respectively. A central performance counter module may be operable to coordinate counter data from the plurality of first performance counter modules and the plurality of second performance modules, the a central performance counter module, the plurality of first performance counter modules, and the plurality of second performance counter modules connected by a daisy chain connection.

20 Claims, 8 Drawing Sheets

DISTRIBUTED PERFORMANCE COUNTERS

STATEMENT REGARDING FEDERALLY SPONSORED RESEARCH OR DEVELOPMENT

This invention was made with Government support under Contract No.: B554331 awarded by Department of Energy. The Government has certain rights in this invention.

CROSS-REFERENCE TO RELATED APPLICATIONS

The present invention is related to the following commonly-owned, co-pending United States patent Applications filed on even date herewith, the entire contents and disclosure of each of which is expressly incorporated by reference herein as if fully set forth herein. U.S. patent application Ser. No. 12/684,367 for "USING DMA FOR COPYING PERFORMANCE COUNTER DATA TO MEMORY"; U.S. patent application Ser. No. 12/684,172, filed Jan. 8, 2010, for "HARDWARE SUPPORT FOR COLLECTING PERFORMANCE COUNTERS DIRECTLY TO MEMORY"; U.S. patent application Ser. No. 12/684,190, filed Jan. 8, 2010, for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010, for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, filed on Feb. 1, 2010, for "CONDITIONAL LOAD AND STORE IN A SHARED CACHE"; U.S. patent application Ser. No. 61/261,269, filed Nov. 13, 2009, for "LOCAL ROLLBACK FOR FAULT-TOLERANCE IN PARALLEL COMPUTING SYSTEMS"; U.S. patent application Ser. No. 12/684,860, filed Jan. 8, 2010, for "PAUSE PROCESSOR HARDWARE THREAD UNTIL PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 13/008,602, filed Jan. 18, 2011, for "CACHE DIRECTORY LOOKUP READER SET ENCODING FOR PARTIAL CACHE LINE SPECULATION SUPPORT"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "SUPPORT FOR NON-LOCKING PARALLEL RECEPTION OF PACKETS BELONGING TO A SINGLE MEMORY RECEPTION FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, filed Jan. 10, 2011, for "MULTI-PETASCALE HIGHLY EFFICIENT PARALLEL SUPERCOMPUTER"; U.S. patent application Ser. No. 12/984,252, filed Jan. 4, 2011, for "CACHE WITHIN A CACHE"; U.S. patent application Ser. No. 13/008,502, filed Jan. 18, 2011, for "MULTIPROCESSOR SYSTEM WITH MULTIPLE CONCURRENT MODES OF EXECUTION"; U.S. patent application Ser. No. 13/008,583, filed Jan. 18, 2011, for "READER SET ENCODING FOR DIRECTORY OF SHARED CACHE MEMORY IN MULTIPROCESSOR SYSTEM"; U.S. patent application Ser. No. 12/984,308 filed on Jan. 4, 2011, for "EVICT ON WRITE, A MANAGEMENT STRATEGY FOR A PREFETCH UNIT AND/OR FIRST LEVEL CACHE IN A MULTIPROCESSOR SYSTEM WITH SPECULATIVE EXECUTION"; U.S. patent application Ser. No. 12/984,329 filed Jan. 4, 2011, for "PHYSICAL ALIASING FOR THREAD LEVEL SPECULATION WITH A SPECULATION BLIND CACHE"; 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 13/004,005, filed Jan. 10, 2011, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 12/696,746, filed on Jan. 29, 2010, for "TWO DIFFERENT PREFETCH COMPLEMENTARY ENGINES OPERATING SIMULTANEOUSLY"; U.S. patent application Ser. No. 12/697,015, filed on Jan. 29, 2010, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, filed Mar. 19, 2010, for "EFFICIENCY OF STATIC CORE TURN-OFF IN A SYSTEM-ON-A-CHIP WITH VARIATION"; U.S. patent application Ser. No. 12/697,043, Jan. 29, 2010, for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, for "ATOMICITY: A MULTI-PRONGED APPROACH"; U.S. patent application Ser. No. 12/697,175, filed Jan. 29, 2010 for "I/O ROUTING IN A MULTIDIMENSIONAL TORUS NETWORK"; U.S. patent application Ser. No. 12/684,287, filed Jan. 8, 2010 for ARBITRATION IN CROSSBAR FOR LOW LATENCY; U.S. patent application Ser. No. 12/684,630, filed Jan. 8, 2010, for "EAGER PROTOCOL ON A CACHE PIPELINE DATAFLOW"; U.S. patent application Ser. No. 12/723,277, filed Mar. 12, 2010 for EMBEDDED GLOBAL BARRIER AND COLLECTIVE IN A TORUS NETWORK; U.S. patent application Ser. No. 12/696,764, filed Jan. 29, 2010 for "GLOBAL SYNCHRONIZATION OF PARALLEL PROCESSORS USING CLOCK PULSE WIDTH MODULATION"; U.S. patent application Ser. No. 12/796,411, filed Jun. 8, 2010 for "GENERATION-BASED MEMORY SYNCHRONIZATION IN A MULTIPROCESSOR SYSTEM WITH WEAKLY CONSISTENT MEMORY ACCESSES"; U.S. patent application Ser. No. 12/796,389, filed Jun. 8, 2010 for BALANCING WORKLOAD IN A MULTIPROCESSOR SYSTEM RESPONSIVE TO PROGRAMMABLE ADJUSTMENTS IN A SYNCRONIZATION INSTRUCTION; U.S. patent application Ser. No. 12/696,817, filed Jan. 29, 2010 for HEAP/STACK GUARD PAGES USING A WAKEUP UNIT; U.S. patent application Ser. No. 61/293,603, filed Jan. 8, 2010 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475, filed May 5, 2010 for "REPRODUCIBILITY IN A MULTIPROCESSOR SYSTEM".

FIELD

The present disclosure is related to hardware performance counters.

BACKGROUND

Generally, hardware performance counters are extra logic added to the central processing unit (CPU) to track low-level operations or events within the processor. For example, there are counter events that are associated with the cache hierarchy that indicate how many misses have occurred at L1, L2, and the like. Other counter events indicate the number of instructions completed, number of floating point instructions executed, translation lookaside buffer (TLB) misses, and others. A typical computing system provides a small number of counters dedicated to collecting and/or recording performance events for each processor in the system. These counters consume significant logic area, and cause high-power dissipation. As such, only a few counters are typically provided. Current computer architecture allows many processors or cores to be incorporated into a single chip. Having only a handful of performance counters per processor does not provide the ability to count many events simultaneously from each processor.

BRIEF SUMMARY

A distributed performance counter device, in one aspect, may include a plurality of first performance counter modules coupled to a plurality of processing cores, the plurality of first performance counter modules operable to collect performance data associated with the plurality of processing cores respectively. A plurality of second performance counter modules may be coupled to a plurality of L2 cache units, the plurality of second performance counter modules operable to collect performance data associated with the plurality of L2 cache units respectively. A central performance counter module may be operable to coordinate counter data from the plurality of first performance counter modules and the plurality of second performance modules. The central performance counter module, the plurality of first performance counter modules, and the plurality of second performance counter modules are connected by a daisy chain connection, and the plurality of first performance counter modules, and the plurality of second performance counter modules place respective count data on the daisy chain connection every predetermined cycle for transferring the count data to the central performance counter module for central storage.

A method for distributed performance counters, in one aspect, may include collecting local counter data information by a plurality of performance counters residing locally with respective plurality of processing units and L2 cache units. The method also may include placing on lower bits of a daisy chain bus, the collected local counter data information by the plurality of performance counters at a predetermined interval of time specified on upper bits of the daisy chain bus. The method further may include storing by a central performance counter module, the local counter data information placed on the lower bits of the daisy chain bus.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one aspect, the storage needed for majority of performance count data is centralized, thereby achieving an area reduction. For instance, only a small number of least-significant bits are kept in the local units, thus saving area. This allows each processor to keep a large number of performance counters (e.g., 24 local counters per processor) at low resolution (e.g., 14 bits). To attain higher resolution counts, the local counter unit periodically transfer its counter values (counts) to a central unit. The central unit aggregates the counts into a higher resolution count (e.g., 64 bits). The local counters count a number of events, e.g., up to the local counter capacity. Before the local counter overflow occurs, it transfers its count to the central unit. Thus, no counts are lost in the local counters. The count values may be stored in a memory device such as a single central Static Random Access Memory (SRAM), which provides high bit density. Using this approach, it becomes possible to have multiples of performance counters supported per processor, while still providing for very large (e.g. 64 bit) counter values.

In another aspect, the memory or central SRAM may be used in multiple modes: a distributed mode, where each core or processor on a chip provides a relatively small number of counts (e.g., 24 per processor), as well as a detailed mode, where a single core or processor can provide a much larger number of counts (e.g., 116).

In yet another aspect, multiple performance counter data counts from multiple performance counters residing in multiple processing modules (e.g., cores and cache modules) may be collected via a single daisy chain bus in a predetermined number of cycles. The predetermined number of cycles depends on the number of performance counters per processing module, the number of processing modules residing on the daisy chain bus, and the number of bits that can be transferred at one time on the daisy chain. In the description herein, the example configuration of the chip supports 24 local counters in each of its 17 cores, 16 local counters in each of its 16 L2 cache units or modules. The daisy chain bus supports 96 bits of data. Other configurations are possible, and the present invention is not limited only to that configuration.

In still yet another aspect, the performance counter modules and monitoring of performance data may be programmed by user software. Counters of the present disclosure may be configured through memory access bus. The hardware modules of the present disclosure are configured as not privileged such that user program may access the counter data and configure the modules. Thus, with the methodology and hardware set up of the present disclosure, it is not necessary to perform kernel-level operations such as system calls when configuring and gathering performance counts, which can be costly, Rather, the counters are under direct user control.

Still yet in another aspect, the performance counters and associated modules are physically placed near the cores or processing units to minimize overhead and data travel distance and to provide low-latency control and configuration of the counters by the unit to which the counters are associated.

Figure 1:
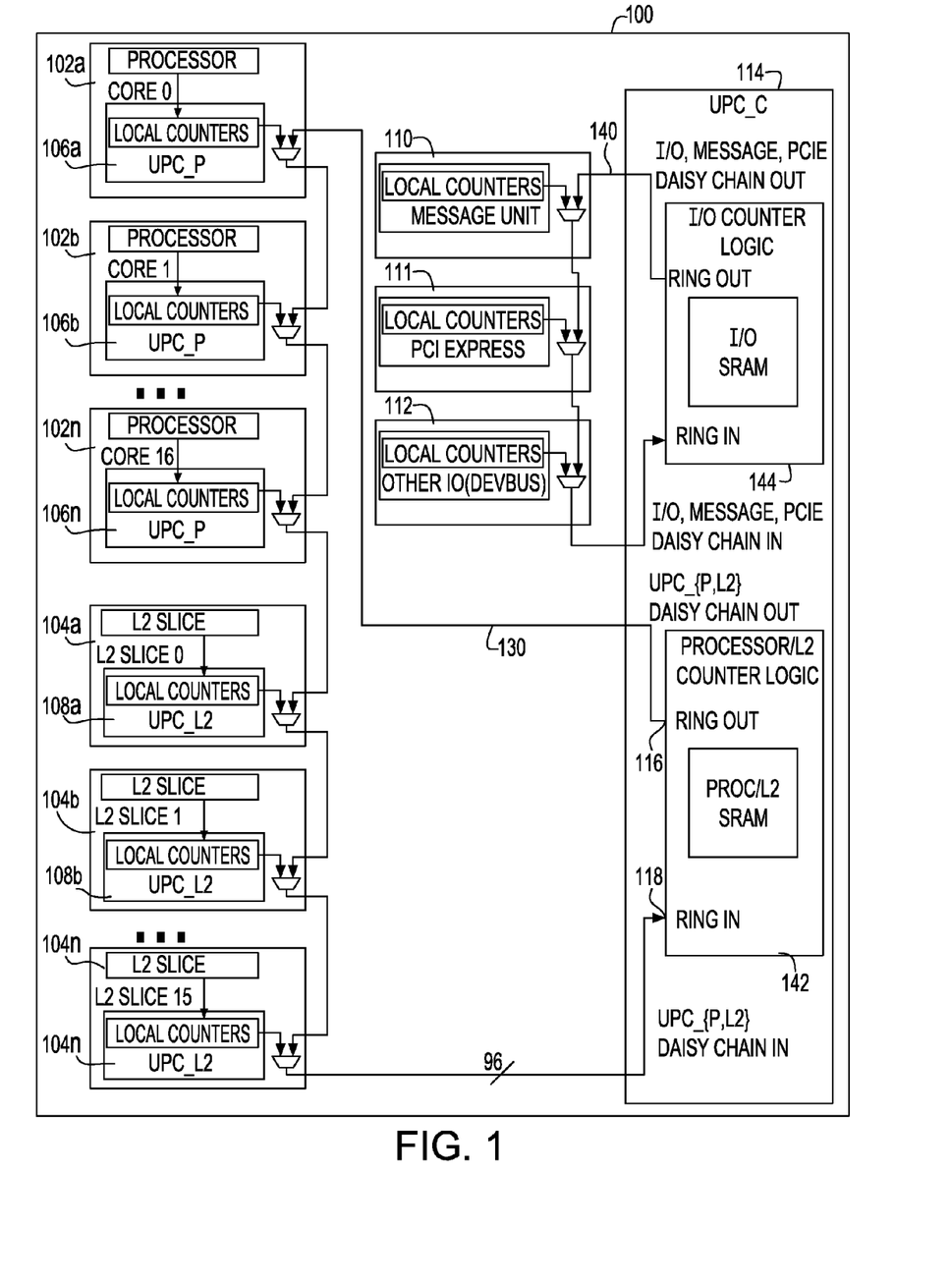
FIG. 1 is a high level diagram illustrating performance counter structure on a single chip that includes several processor modules and L2 slice modules in one embodiment of the present disclosure.

FIG. 1 is a high level diagram illustrating performance counter structure of the present disclosure in one embodiment. It depicts a single chip that includes several processor modules, as well as several L2 slice modules. The processor modules each have an associated counter logic unit, referred to as the UPC_P. The UPC_P gathers and aggregates event information from the processor to which it is attached. Similarly, the UPC_L2 module performs the equivalent function for the L2 Slice. In the figure, the UPC_P and UPC_L2 modules are all attached to a single daisy-chain bus structure. Each UPC_P/L2 module periodically sends count information to the UPC_C unit via this bus.

A processing node may have multiple processors or cores and associated L1 cache units, L2 cache units, a messaging or network unit, and I/O interfaces such as PCI Express. The performance counters of the present disclosure allow the gathering of performance data from such functions of a processing node and may present the performance data to software. A processing node 100 also referred to as a chip herein such as an application-specific integrated circuit (ASIC) may include (but not limited to) a plurality of cores (102a, 102b, 102n) with associated L1 cache prefetchers (L1P). The processing node may also include (but not limited to) a plurality of L2 cache units (104a, 104b, 104n), a messaging/network unit 110, PCIe 111 and Devbus 112, connecting to a centralized counter unit referred to herein as UPC_C (114). A core (e.g., 102a, 102b, 102n), also referred to herein as a PU (processing unit) may include a performance monitoring unit or a performance counter (106a, 106b, 106n) referred to herein as UPC_P. UPC_P resides in the PU complex and gathers performance data from the associated core (e.g., 102a, 102b, 102n). Similarly, an L2 cache unit (e.g., 104a, 104b, 104n) may include a performance monitoring unit or a performance counter (e.g., 108a, 108b, 108n) referred to herein as UPC_L2. UPC_L2 resides in the L2 module and gathers performance data from it. The terminology UPC (universal performance counter) is used in this disclosure synonymously or interchangeable with general performance counter functions.

UPC_C 114 may be a single, centralized unit within the processing node 100, and may be responsible for coordinating and maintaining count data from the UPC_P (106a, 106b, 106n) and UPC_L2 (108a, 108b, 108n) units. The UPC_C unit 114 (also referred to as the UPC_C module) may be connected to the UPC_P (104a, 104b, 104n) and UPC_L2 (108a, 108b, 108n) via a daisy chain bus 130, with the start 116 and end 118 of the daisy chain beginning and terminating at the UPC_C 114. The performance counter modules (i.e., UPC_P, UPC_L2 and UPC_C) of the present disclosure may operate in different modes, and depending on the operating mode, the UPC_C 114 may inject packet framing information at the start of the daisy chain 116, enabling the UPC_P (104a, 104b, 104n) and/or UPC_L2 (108a, 108b, 108n) modules or units to place data on the daisy chain bus 130 at the correct time slot. In a similar manner, messaging/network unit 110, PCIe 111 and Devbus 112 may be connected via another daisy chain bus 140 to the UPC_C 114.

The performance counter functionality of the present disclosure may be divided into two types of units, a central unit (UPC_C), and a group of local units. Each of the local units performs a similar function, but may have slight differences to enable it to handle, for example, a different number of counters or different event multiplexing within the local unit. For gathering performance data from the core and associated L1, a processor-local UPC unit (UPC_P) is instantiated within each processor complex. That is, a UPC_P is added to the processing logic. Similarly, there may be a UPC unit associated with each L2 slice (UPC_L2). Each UPC_L2 and UPC_P unit may include a small number of counters. For example, the UPC_P may include 24 14 bit counters, while the UPC_L2 counters may instantiate 16 10 bit counters. The UPC ring (shown as solid line from 116 to 118) may be connected such that each UPC_P (104a, 104b, 104n) or UPC_L2 unit (108a, 108b, 108n) may be connected to its nearest neighbor. In one aspect, the daisy chain may be implemented using only registers in the UPC units, without extra pipeline latches.

Although not shown or described, a person of ordinary skill in the art will appreciate that a processing node may include other units and/or elements. The processing node 100 may be an application-specific integrated circuit (ASIC), or a general-purpose processing node.

The UPC of the present disclosure may operate in different modes, as described below. However, the UPC is not limited to only those modes of operation.

Mode 0 (Distributed Count Mode)

In this operating mode (also referred to as distributed count mode), counts from multiple performance counters residing in each core or processing unit and L2 unit may be captured. For example, in an example implementation of a chip that includes 17 cores each with 24 performance counters, and 16 L2 units each with 16 performance counters, 24 counts from 17 UPC_P units and 16 counts from 16 UPC_L2 units may be simultaneously captured. Local UPC_P and UPC_L2 counters are periodically transferred to a corresponding 64 bit counter residing in the central UPC unit (UPC_C), over a 96 bit daisy chain bus. Partitioning the performance counter logic into local and central units allows for logic reduction, but still maintains 64 bit fidelity of event counts. Each UPC_P or UPC_L2 module places its local counter data on the daisy chain (4 counters at a time), or passes 96 bit data from its neighbor. The design guarantees that all local counters will be transferred to the central unit before they can overflow locally (by guaranteeing a slot on the daisy chain at regular intervals). With a 14 bit local UPC_P counter, each counter is transferred to the central unit at least every 1024 cycles to prevent overflow of the local counters. In order to cover corner cases and minimize the latency of updating the UPC_C counters, each counter is transferred to the central unit every 400 cycles. For Network, DevBus and PCIe, a local UPC unit similar to UPC_L2 and UPC_P may be used for these modules.

Mode 1 (Detailed Count Mode)

In this mode, the UPC_C assists a single UPC_P or UPC_L2 unit in capturing performance data. More events can be captured in the mode from a single processor (or core) or L2 than can be captured in distributed count mode. However, only one UPC_P or UPC_L2 may be examined at a time.

The UPC_P and UPC_L2 modules may be connected to the UPC_C unit via a 96 bit daisy chain, using a packet based protocol. Each UPC operating mode may use a different protocol. For example, in Mode 0 or distributed mode, each UPC_P and/or UPC_L2 places its data on the daisy chain bus at a specific time (e.g., cycle or cycles). In this mode, the UPC_C transmits framing information on the upper bits (bits 64:95) of the daisy chain. Each UPC_P and/or UPC_L2 module uses this information to place its data on the daisy chain at the correct time. The UPC_P and UPC_L2 send their counter data in a packet on bits 0:63 of the performance daisy chain. Bits 64:95 are generated by the UPC_C module, and passed unchanged by the UPC_P and/or UPC_L2 module. Table 1-2 defines example packets sent by UPC_P. Table 1-3 defines example packets sent by UPC_L2. Table 1-4 shows framing information injected by the UPC_C. The packet formats and framing information may be pre-programmed or hard-coded in the logic of the processing.

TABLE 1-2

UPC_P Daisy Chain Packet Format

| Cycle | Bit 0:15 | Bits 16:31 | Bits 32:47 | Bits 48:63 | Bits 64:95 |
|---|---|---|---|---|---|
| 0 | Counter 0 | Counter 1 | Counter 2 | Counter 3 | Passed Unchanged |
| 1 | Don't Care | Don't Care | Don't Care | Don't Care | Passed Unchanged |
| 2 | Counter 4 | Counter 5 | Counter 6 | Counter 7 | Passed Unchanged |
| 3 | Don't Care | Don't Care | Don't Care | Don't Care | Passed Unchanged |
| 4 | Counter 8 | Counter 9 | Counter 10 | Counter 11 | Passed Unchanged |
| 5 | Don't Care | Don't Care | Don't Care | Don't Care | Passed Unchanged |
| 6 | Counter 12 | Counter 13 | Counter 14 | Counter 15 | Passed Unchanged |
| 7 | Don't Care | Don't Care | Don't Care | Don't Care | Passed Unchanged |
| 8 | Counter 16 | Counter 17 | Counter 18 | Counter 19 | Passed Unchanged |
| 9 | Don't Care | Don't Care | Don't Care | Don't Care | Passed Unchanged |
| 10 | Counter 20 | Counter 21 | Counter 22 | Counter 23 | Passed Unchanged |
| 11 | Don't Care | Don't Care | Don't Care | Don't Care | Passed Unchanged |
| 12 | Don't Care | Don't Care | Don't Care | Don't Care | Passed Unchanged |
| 13 | Don't Care | Don't Care | Don't Care | Don't Care | Passed Unchanged |
| 14 | Don't Care | Don't Care | Don't Care | Don't Care | Passed Unchanged |
| 15 | Don't Care | Don't Care | Don't Care | Don't Care | Passed Unchanged |

Table 1-2 defines example packets sent by an UPC_P. Each UPC_P may follow this format. Thus, the next UPC_P may send packets on the next 16 cycles, i.e., 16-31. The next UPC_P may send packets on the next 16 cycles, i.e., 32-47, and so forth. Table 1-5 shows an example of cycle to performance counter unit mappings.

Similar to UPC_P, the UPC_L2 may place data from its counters (e.g., 16 counters) on the daisy chain in an 8-flit packet, on daisy chain bits 0:63. This is shown in Table 1-3.

TABLE 1-3

UPC_L2 Daisy Chain Packet Format

| Cycle | Bit 0:15 | Bits 16:31 | Bits 32:47 | Bits 48:63 | Bits 64:95 |
|---|---|---|---|---|---|
| 0 | Counter 0 | Counter 1 | Counter 2 | Counter 3 | Passed Unchanged |
| 1 | Don't Care | Don't Care | Don't Care | Don't Care | Passed Unchanged |
| 2 | Counter 4 | Counter 5 | Counter 6 | Counter 7 | Passed Unchanged |
| 3 | Don't Care | Don't Care | Don't Care | Don't Care | Passed Unchanged |
| 4 | Counter 8 | Counter 9 | Counter 10 | Counter 11 | Passed Unchanged |
| 5 | Don't Care | Don't Care | Don't Care | Don't Care | Passed Unchanged |
| 6 | Counter 12 | Counter 13 | Counter 14 | Counter 15 | Passed Unchanged |
| 7 | Don't Care | Don't Care | Don't Care | Don't Care | Passed Unchanged |

Table 1-4 shows the framing information transmitted by the UPC_C in Mode 0.

TABLE 1-4

UPC_C Daisy Chain Packet Format, bits 64:95

| Bits | Function |
|---|---|
| 64:72 | Daisy Chain Cycle Count (0-399) |
| 73 | '0'-- unused |
| 74:81 | counter_arm_q(0 to 7) - counter address (four counters at a time) for overflow indication |
| 82:85 | counter_arm_q(8 to 11) - mask bit for each adder slice, e.g. 4 counters per sram location |
| 86:93 | (others => '0') |
| 94 | upc_pu_ctl_q(0) - turns on run bit in upc_p |
| 95 | upc_pu_ctl_q(1) - clock gate for ring |

In this example format of both the UPC_P and UPC_L2 packet formats, every other flit contains no data. Flit refers to one cycle worth of information. The UPC_C uses these "dead" cycles to service memory-mapped 110 (MMIO) requests to the Static Random Access Memory (SRAM) counters or the like.

The UPC_L2 and UPC_P modules monitor the framing information produced by the UPC_C. The UPC_C transmits a repeating cycle count, ranging from 0 to 399 decimal. Each UPC_P and UPC_L2 compares this count to a value based on its logical unit number, and injects its packet onto the daisy chain when the cycle count matches the value for the given unit. The values compared by each unit are shown in Table 1-5.

TABLE 1-5

Cycle each unit places data on daisy chain, Mode 0

| UPC_P ID | Cycle Injected (decimal) | Cycle Injected (hex) | UPC_L2 ID | Cycle Injected (decimal) | Cycle Injected (hex) |
|---|---|---|---|---|---|
| PU_0 | 0 | 9'h000 | L2_0 | 272 | 9'h110 |
| PU_1 | 16 | 9'h010 | L2_1 | 280 | 9'h118 |
| PU_2 | 32 | 9'h020 | L2_2 | 288 | 9'h120 |
| PU_3 | 48 | 9'h030 | L2_3 | 296 | 9'h128 |
| PU_4 | 64 | 9'h040 | L2_4 | 304 | 9'h130 |
| PU_5 | 80 | 9'h050 | L2_5 | 312 | 9'h138 |
| PU_6 | 96 | 9'h060 | L2_6 | 320 | 9'h140 |
| PU_7 | 112 | 9'h070 | L2_7 | 328 | 9'h148 |
| PU_8 | 128 | 9'h080 | L2_8 | 336 | 9'h150 |
| PU_9 | 144 | 9'h090 | L2_9 | 344 | 9'h158 |

TABLE 1-5-continued

Cycle each unit places data on daisy chain, Mode 0

| UPC_P ID | Cycle Injected (decimal) | Cycle Injected (hex) | UPC_L2 ID | Cycle Injected (decimal) | Cycle Injected (hex) |
|---|---|---|---|---|---|
| PU_10 | 160 | 9'h0A0 | L2_10 | 352 | 9'h160 |
| PU_11 | 176 | 9'h0B0 | L2_11 | 360 | 9'h168 |
| PU_12 | 192 | 9'h0C0 | L2_12 | 368 | 9'h170 |
| PU_13 | 208 | 9'h0D0 | L2_13 | 376 | 9'h178 |
| PU_14 | 224 | 9'h0E0 | L2_14 | 384 | 9'h180 |
| PU_15 | 240 | 9'h0F0 | L2_15 | 392 | 9'h188 |
| PU_16 | 256 | 9'h100 | | | |

Mode 0 Support for Simultaneous Counter Stop/Start

In Mode 0 (also referred to as distributed count mode), each UPC_P and UPC_L2 may contribute counter data. It may be desirable to have the local units start and stop counting on the same cycle. To accommodate this, the UPC_C sends a counter start/stop bit on the daisy chain. Each unit can be programmed to use this signal to enable or disable their local counters. Since each unit is on a different position on the daisy chain, each unit delays a different number of cycles, depending on their position in the daisy chain, before responding to the counter start/stop command from the UPC_C. This delay value may be hard coded into each UPC_P/UPC_L2 instantiation.

Mode 1 UPC_P, UPC_L2 Daisy Chain Protocol

As described above, Mode 1 (also referred to as detailed count mode) may be used to allow more counters per processor or L2 than what the local counters provide. In this mode, a given UPC_P or UPC_L2 is selected for ownership of the daisy chain. The selected UPC_P or UPC_L2 sends 92 bits of real time performance event data to the UPC_C for counting. In addition, the local counters are transferred to the UPC_C as in Mode 0. One daisy chain wire can be used to transmit information from all the performance counters in the processor, e.g., all 24 performance counters. The majority of the remaining wires can be used to transfer events to the UPC_C for counting. The local counters may be used in this mode to count any event presented to it. Also, all local counters may by used for instruction decoding. In Mode 1 92 events may be selected for counting by the UPC_C unit. 1 bit of the daisy chain is used to periodically transfer the local counters to the UPC_C, while 92 bits are used to transfer events. The three remaining bits are used to send control information and power gating signals to the local units. The UPC_C sends a rotating count from 0-399 on daisy chain bits 64:72, identically to Mode 0. The UPC_P or UPC_L2 that is selected for Mode 1 places it's local counters on bits 0:63 in a similar fashion as Mode 0, e.g. when the local unit decodes a certain value of the ring counter.

Examples of the data sent by the UPC_P are shown in Table 1-6. UPC_L2 may function similarly, for example, with 32 different types of events being supplied. The specified bits may be turned on to indicate the selected events for which the count is being transmitted. Daisy chain bus bits 92-95 specify control information such as the packet start signal on a given cycle.

TABLE 1-6

UPC_P Mode 1 Daisy Chain Packet Definition

| Bit Field | Function |
|---|---|
| 0:7 | UPC_P Mode 1 Event Group 0 (8 events) |
| 8:15 | UPC_P Mode 1 Event Group 1 (8 events) |
| 16:23 | UPC_P Mode 1 Event Group 2 (8 events) |
| 24:31 | UPC_P Mode 1 Event Group 3 (8 events) |
| 32:39 | UPC_P Mode 1 Event Group 4 (8 events) |
| 40:47 | UPC_P Mode 1 Event Group 5 (8 events) |
| 48:55 | UPC_P Mode 1 Event Group 6 (8 events) |
| 56:63 | UPC_P Mode 1 Event Group 7 (8 events) |
| 64:70 | UPC_P Mode 1 Event Group 8 (7 events) |
| 71:77 | UPC_P Mode 1 Event Group 9 (7 events) |
| 78:84 | UPC_P Mode 1 Event Group 10 (7 events) |
| 85:91 | UPC_P Mode 1 Event Group 11 (7 events) |
| 92:95 | Local Counter Data |

Figure 2:
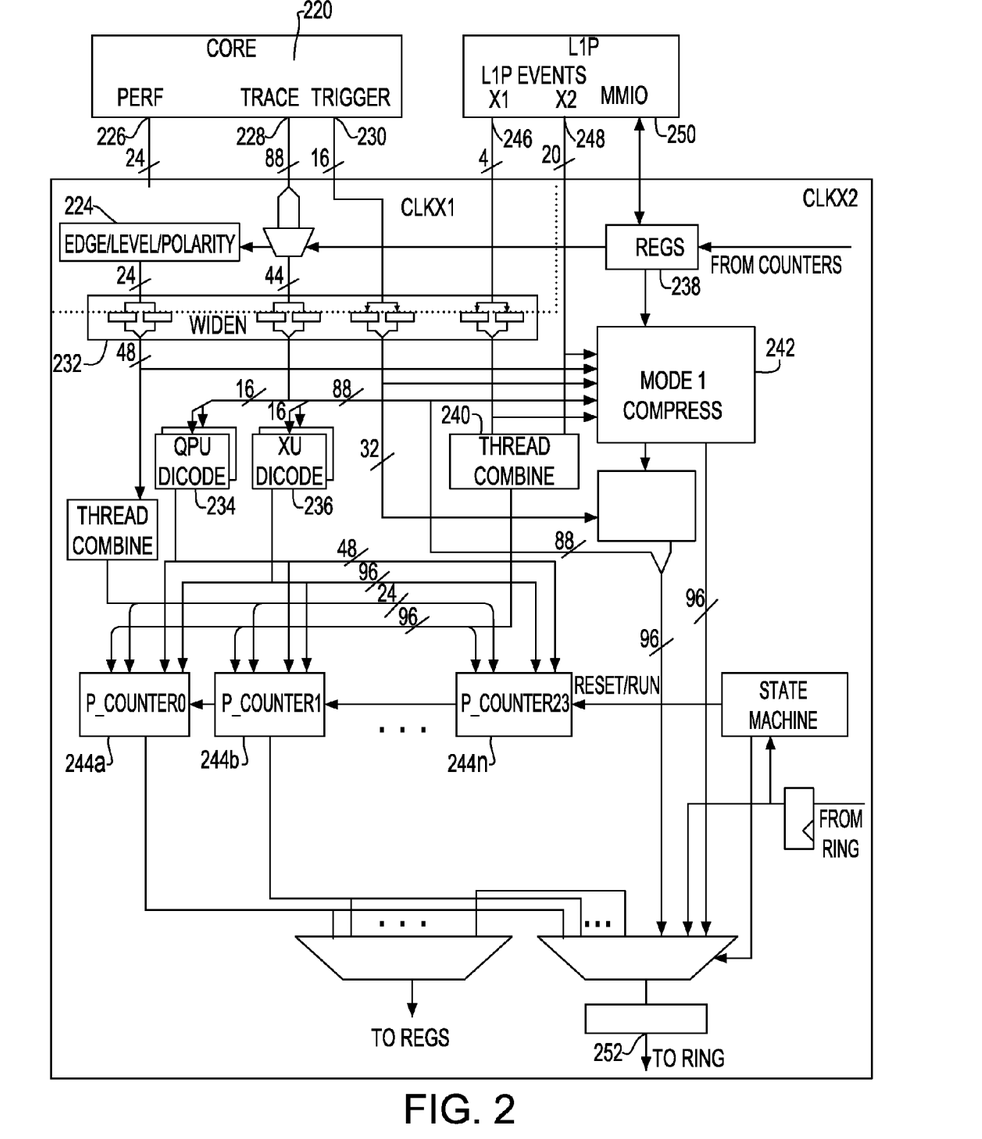
FIG. 2 illustrates a structure of the UPC_P unit in one embodiment of the present disclosure.
Figure 3:
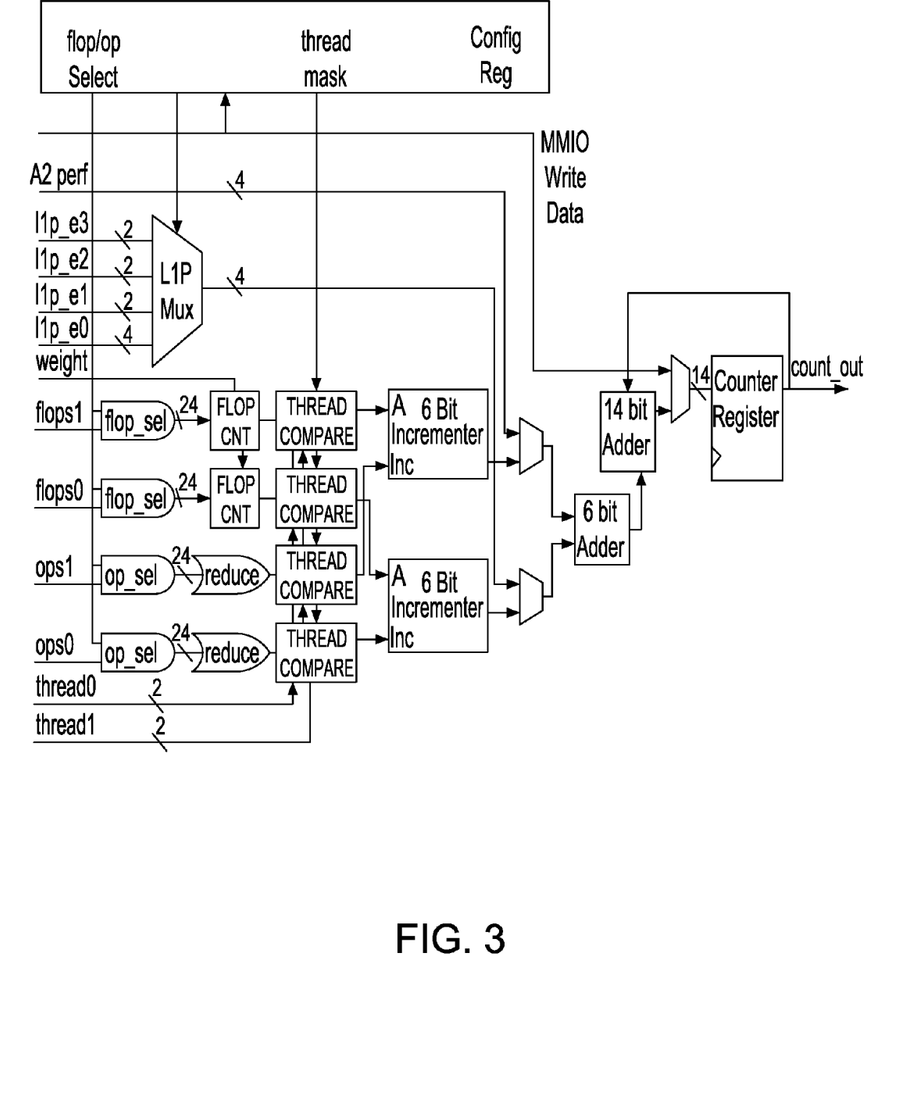
FIG. 3 shows a structure of the UPC_P counter unit in one embodiment of the present disclosure.

FIG. 2 illustrates a structure of the UPC_P unit or module in one embodiment of the present disclosure. The UPC_P module 200 may be tightly coupled to the core 220 which may also include L1 prefetcher module or functionality. It gathers performance and trace data from the core 220 and presents it to the UPC_C via the daisy chain bus for further processing.

The UPC_P module may use the x1 and x2 clocks. It may expect the x1 and x2 clocks to be phase-aligned, removing the need for synchronization of x1 signals into the x2 domain.

UPC_P Modes

As described above, the UPC_P module 200 may operate in distributed count mode or detailed count mode. In distributed count mode (Mode 0), a UPC_P module 200 may monitor performance events, for example 24 performance events from its 24 performance counters. The daisy chain bus is time multiplexed so that each UPC_P module sends its information to the UPC_C in turn. In this mode, the user may count 24 events per core, for example.

In Mode 1 (detailed count mode), one UPC_P module may be selected for ownership of the daisy chain bus. Data may be combined from the various inputs (core performance bus, core trace bus, L1P events), formatted and sent to the UPC_C unit each cycle. The UPC_C unit may decode the information provided on the daisy chain bus into as many as 116 (92 wires for raw events and 24 for local counters) separate events to be counted from the selected core or processor complex. For the raw events, the UPC_C module manages the low order bits of the count data, similar to the way that the UPC_P module manages its local counts.

Edge/Level/Polarity module 224 may convert level signals emanating from the core's Performance bus 226 into single cycle pulses suitable for counting. Each performance bit has a configurable polarity invert, and edge filter enable bit, available via a configuration register.

Widen module 232 converts signals from one clock domain into another. For example, the core's Performance 226, Trace 228, and Trigger 230 busses all may run at clkx1 rate, and are transitioned to the clkx2 domain before being processed by the UPC_P. Widen module 232 performs that conversion, translating each died clock domain signal into 2 clkx2 signals (even and odd). This module is optional, and may be used if the rate at which events are output are different (e.g., faster or slower) than the rate at which events are accumulated at the performance counters.

QPU Decode module 234 and execution unit (XU) Decode module 236 take the incoming opcode stream from the trace bus, and decode it into groups of instructions. In one aspect, this module resides in the clkx2 domain, and there may be two opcodes (even and odd) of each type (XU and QPU) to be decoded per clkx2 cycle. To accomplish this, two QPU and two XU decode units may be instantiated. This applies to implementations where the core 220 operates at twice the speed, i.e., outputs 2 events, per operating cycle of the performance counters, as explained above. The 2 events saved by the widen module 232 may be processed at the two QPU and two XU decode units. The decoded instruction stream is then sent to the counter blocks for selection and counting.

Registers module 238 implements the interface to the MMIO bus. This module may include the global MMIO configuration registers and provide the support logic (readback muxes, partial address decode) for registers located in the UPC_P Counter units. User software may program the performance counter functions of the present disclosure via the MMIO bus.

Thread Combine module 240 may combine identical events from each thread, counts them, and present a value for accumulation by a single counter. Thread Combine module 240 may conserve counters when aggregate information across all threads is needed. Rather than using four counters (or number of counters for each thread), and summing in software, summing across all threads may be done in hardware using this module. Counters may be selected to support thread combining.

The Mode 1 Compress module 242 may combine event inputs from the core's event bus 226, the local counters 224a ... 224n, and the L1 cache prefetch (UP) event bus 246, 248, and place them on the appropriate daisy chain lines for transmission to the UPC_C, using a predetermined packet format, for example, shown in Table 1-6. This module 242 may divide the 96 bit bus into 12 Event groups, with Event Group 0-7 containing 8 events, and Event Groups 8-11 containing 7 events, for a total of 92 events. Some event group bits can be sourced by several events. Not all events may connect to all event groups. Each event group may have a single multiplexer (mux) control, spanning the bits in the event group.

There may be 24 UPC_P Counter units in each UPC_P module. To minimize muxing, not all counters are connected to all events. Similarly, all counters may be used to count opcodes, but this is not required. Counters may be used to capture a given core's performance event or L1P event.

Referring to FIG. 2, a core or processor (220) may provide performance and trace data via busses. Performance (Event) Bus 226 may provide information about the internal operation of the core. The bus may be 24 bits wide. The data may include performance data from the core units such as execution unit (XU), instruction unit (IU), floating point unit (FPU), memory management unit (MMU). The core unit may multiplex (mux) the performance events for each unit internally before presenting the data on the 24 bit performance interface. Software may specify the desired performance event to monitor, i.e., program the multiplexing, for example, using a device control register (DCR) or the like. The core 220 may output the appropriate data on the performance bus 226 according to the software programmed multiplexing.

Trace (Debug) Bus 228 may be used to collect the opcode of all committed instructions.

MMIO interface 250 to allow configuration and interrogation of the UPC_P module by the local core unit (220).

UPC_P Outputs

The UPC_P 200 may include two output interfaces. A UPC_P daisy chain bus 252, used for transfer of UPC_P data to the UPC_C, and a MMIO bus 250, used for reading/writing of configuration and count information from the UPC_P.

UPC_L2 Module

Figure 4:
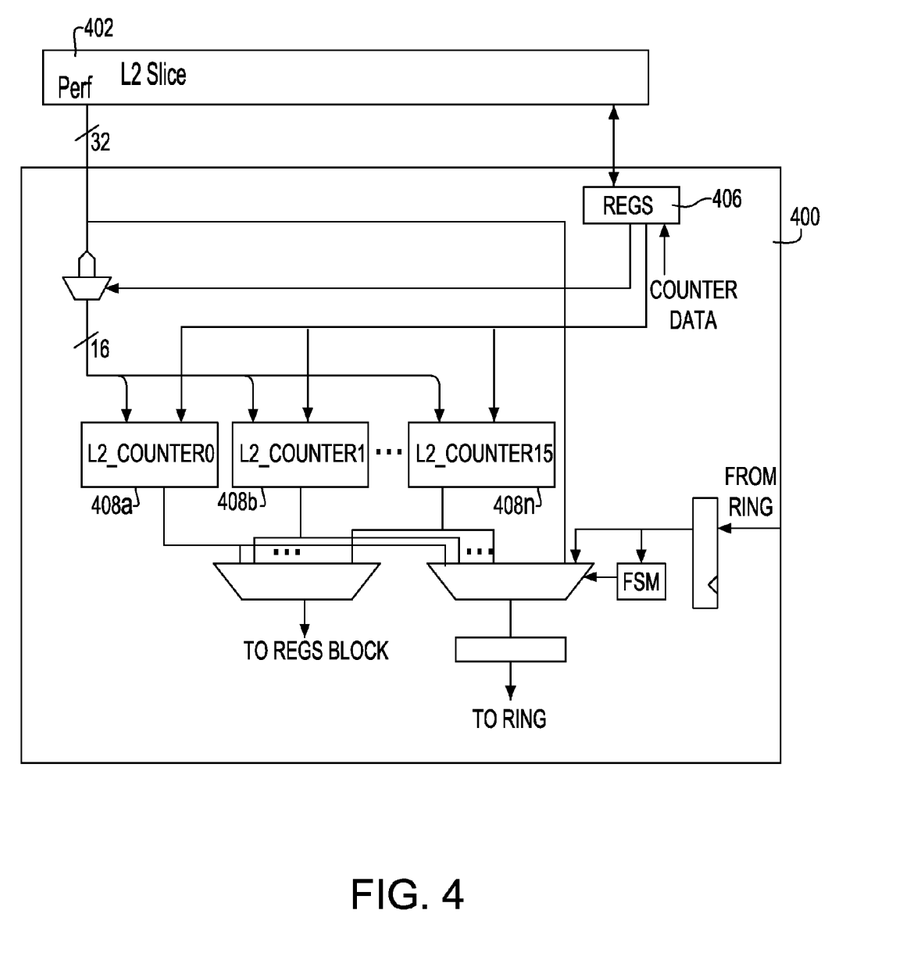
FIG. 4 illustrates an example structure of a UPC_L2 module in one embodiment of the present disclosure.

FIG. 4 illustrates an example structure of a UPC_L2 module in one embodiment. The UPC_L2 module 400 is coupled to the L2 slice 402; the coupling may be tight. UPC_L2 module 400 gathers performance data from the L2 slice 402 and presents it to the UPC_C for further processing. Each UPC_L2 400 may have 16 dedicated counters (e.g., 408a, 408b, 408n), each capable of selecting one of two events from the L2 (402). For L2 with 32 possible events that can be monitored, either L2 events 0-15 or L2 events 16-31 can be counted at any given time. There may be a single select bit that determines whether events 0:15 or events 16:31 are counted. The counters (e.g., 408a, 408b, 408n) may be configured through MMIO memory access bus to enable selecting of appropriate events for counting.

UPC_L2 Modes

The UPC_L2 module 400 may operate in distributed count mode (Mode 0) or detailed count mode (Mode 1). In Mode 0, each UPC_L2 module may monitor 16 performance events, on its 16 performance counters. The daisy chain bus is time multiplexed so that each UPC_L2 module sends its information to the UPC_C in turn. In this mode, the user may count 16 events per L2 slice. In Mode 1, one UPC_L2 module is selected for ownership of the daisy chain bus. In this mode, all 32 events supported by the L2 slice may be counted.

UPC_C Module

Referring back to FIG. 1, a UPC_C module 114 may gather information from the PU, L2, and Network Units, and maintain 64 bit counts for each performance event. The UPC_C may contain, for example, a 256Dx264W SRAM, used for storing count and trace information.

The UPC_C module may operate in different modes. In Mode 0, each UPC_P and UPC_L2 contribute 24 and 16 performance events, respectively. In this way, a coarse view of the entire ASIC may be provided. In this mode, the UPC_C Module 114 sends framing information to the UPC_P and UPC_L2 modules to the UPC_C. This information is used by the UPC_P and UPC_L2 to globally synchronize counter starting/stopping, and to indicate when each UPC_P or UPC_L2 should place its data on the daisy chain.

In Mode 1, one UPC_L2 module or UPC_P unit is selected for ownership of the daisy chain bus. All 32 events supported by a selected L2 slice may be counted, and up to 116 events can be counted from a selected PU. A set of 92 counters local to the UPC_C, and organized into Central Counter Groups, is used to capture the additional data from the selected UPC_P or UPC_L2.

The UPC_P/L2 Counter unit 142 gathers performance data from the UPC_P and UPC_L2 units, while the Network/DMA/IO Counter unit 144 gathers event data from the rest of the ASIC, e.g., input/output (I/O) events, network events, direct memory access (DMA) events, etc.

UPC_P/L2 Counter Unit 142 is responsible for gathering data from each UPC_P and UPC_L2 unit, and accumulating in it in the appropriate SRAM location. The SRAM is divided into 32 counter groups of 16 counters each. In Mode 0, each counter group is assigned to a particular UPC_P or UPC_L2 unit. The UPC_P unit has 24 counters, and uses two counter groups per UPC_P unit. The last 8 entries in the second counter group is unused by the UPC_P. The UPC_L2 unit has 16 counters, and fits within a single counter group. For every count data, there may exist an associated location in SRAM for storing the count data.

Software may read or write any counter from SRAM at any time. In one aspect, data is written in 64 bit quantities, and addresses a single counter from a single counter group.

In addition to reading and writing counters, software may cause selected counters of an arbitrary counter group to be added to a second counter group, with the results stored in a third counter group. This may be accomplished by writing to special registers in the UPC_P/L2 Counter Unit 142.

Figure 5:
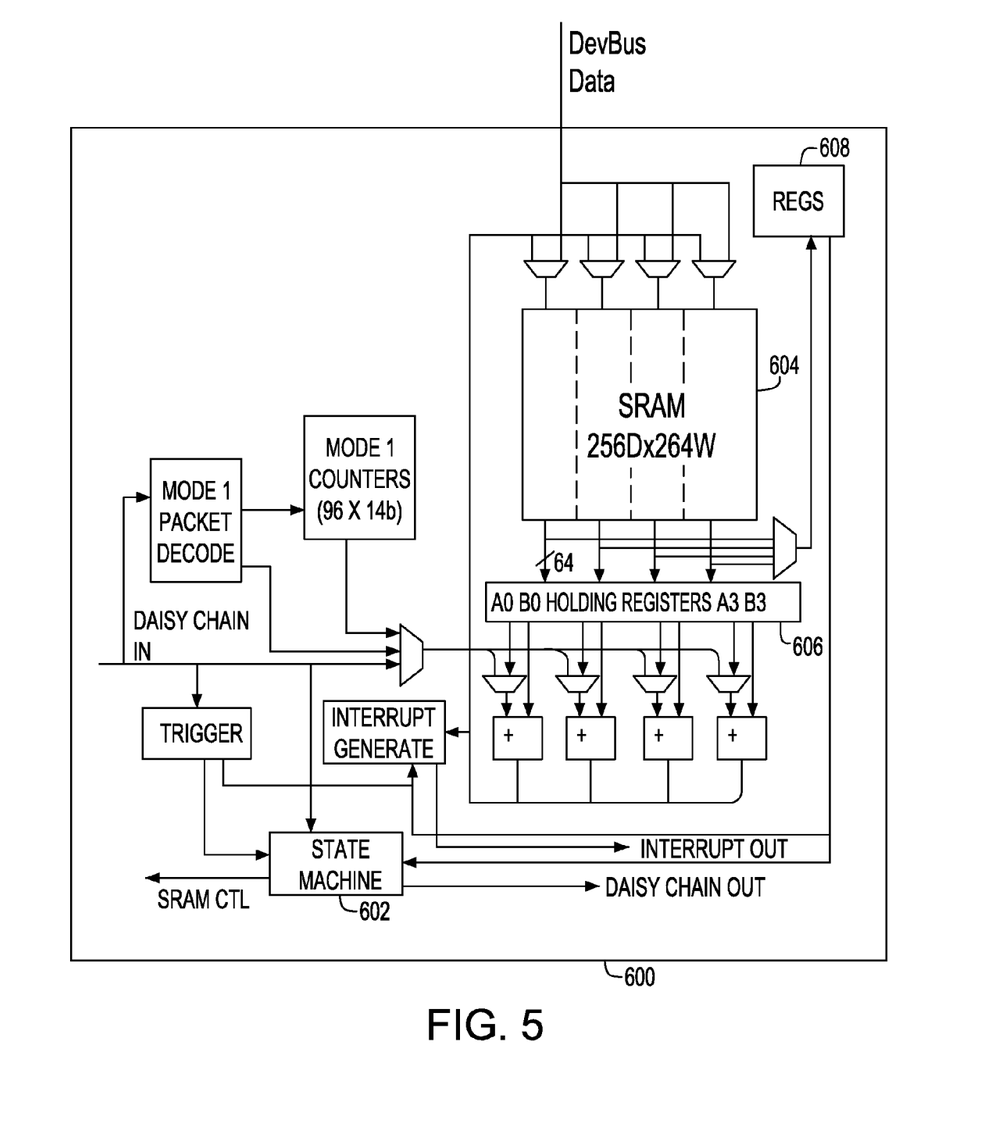
FIG. 5 illustrates an example structure of the UPC_C in one embodiment of the present disclosure.

FIG. 5 illustrates an example structure of the UPC_C Central Unit in one embodiment of the present disclosure. In Mode 0, the state machine 602 sends a rotating count on the daisy chain bus upper bits, as previously described. The state machine 602 fetches from SRAM 604 or the like, the first location from counter group 0, and waits for the count value associated with Counter 0 to appear on the incoming daisy chain. When the data arrives, it is passed through a 64 bit adder, and stored back to the location from which the SRAM was read. The state machine 602 then increments the expected count and fetches the next SRAM location. The fetching of data, receiving the current count, adding the current count to the fetched data and writing back to the memory from where the data was fetched is shown by the route drawn in bold line in FIG. 6. This process repeats for each incoming packet on the daisy chain bus. Thus, previous count stored in the appropriate location in memory 604 is read, e.g., and held in holding registers 606, then added with the incoming count, and written back to the memory 604, e.g., SRAM. The current count data may be also accessed via registers 608, allowing software accessibility.

Concurrently with writing the result to memory, the result is checked for a near-overflow. If this condition has occurred, a packet is sent over the daisy chain bus, indicating the SRAM address at which the event occurred, as well as which of the 4 counters in the SRAM has reached near-overflow (each 256 bit SRAM location stores 4 64-bit counters). Note that any combination of the 4 counters in a single SRAM address can reach near-overflow on a given cycle. Because of this, the counter identifier is sent as separate bits (one bit for each counter in a single SRAM address) on the daisy chain. The UPC_P monitors the daisy chain for overflow packets coming from the UPC_C. If the UPC_P detects a near-overflow packet associated with one or more of its counters, it sets an interrupt arming bit for the identified counters. This enables the UPC_P to issue an interrupt to its local processor on the next overflow of the local counter. In this way, interrupts can be delivered to the local processor very quickly after the actual event that caused overflow, typically within a few cycles.

Upon startup the UPC_C sends an enable signal along the daisy chain. A UPC_P/L2 unit 600 may use this signal to synchronize the starting and stopping of their local counters. It may also optionally send a reset signal to the UPC_P and UPC_L2, directing them to reset their local counts upon being enabled. The 96 bit daisy chain provides adequate bandwidth to support both detailed count mode and distributed count mode operation.

For operating in detailed count mode, the entire daisy chain bandwidth can be dedicated to a single processor or L2. This greatly increases the amount of information that can be sent from a single UPC_P or UPC_L2, allowing the counting of more events. The UPC_P module receives information from three sources: core unit opcodes received via the trace bus, performance events from the core unit, and events from the LIP. In Mode 1, the bandwidth of the daisy chain is allocated to a single UPC_P or UPC_L2, and used to send more information. Global resources in the UPC_C (The Mode 1 Counter unit) assist in counting performance events, providing a larger overall count capability.

The UPC_P module may contain decode units that provide roughly 50 groups of instructions that can be counted. These decode units may operate on 4 16 bit instructions simultaneously. In one aspect, instead of transferring raw opcode information, which may consume available bandwidth, the UPC_P local counters may be used to collect opcode information. The local counters are periodically transmitted to the UPC_C for aggregation with the SRAM counter, as in Mode 0. However, extra data may be sent to the UPC_C in the Mode 1 daisy chain packet. This information may include event information from the core unit and associated L1 prefetcher. Multiplexers in the UPC_P can select the events to be sent to the UPC_C. This approach may use 1 bit on the daisy chain.

The UPC_C may have 92 local counters, each associated with an event in the Mode 1 daisy chain packet. These counters are combined in SRAM with the local counters in the UPC_P or L2. They are organized into 8-counter central counter groups. In total there may be 116 counters in mode 1, (24 counters for instruction decoding, and 92 for event counting).

The daisy chain input feeds events from the UPC_P or UPC_L2 into the Mode 1 Counter Unit for accumulation, while UPC_P counter information is sent directly to SRAM for accumulation. The protocol for merging the low order bits into the SRAM may be similar to Mode 0.

Each counter in the Mode 1 Counter Unit may correspond to a given event transmitted in the Mode 1 daisy chain packet.

The UPC counters may be started and stopped with fairly low overhead. The UPC_P modules map the controls to start and stop counters into MMIO user space for low-latency access that does not require kernel intervention. In addition, a method to globally start and stop counters synchronously with a single command via the UPC_C may be provided. For local use, each UPC_P unit can act as a separate counter unit (with lower resolution), controlled via local MMIO transactions. For example, the UPC_P Counter Data Registers may provide MMIO access to the local counter values. The UPC_P Counter Control Register may provide local configuration and control of each UPC_P counter.

All events may increment the counter by a value of 1 or more.

Software may communicate with the UPC_C via local Devbus access. In addition, UPC_C Counter Data Registers may give software access to each counter on an individual basis. UPC_C Counter Control Registers may allow software to enable each local counter independently. The UPC units provide the ability to count and report various events via MMIO operations to registers residing in the UPC units, which software may utilize via Performance Application Programming Interface (PAPI) Application Program Interface (API).

A UPC_C Accumulate Control Register may allow software to add counter groups to each other, and place the result in a third counter group. This register may be useful for temporarily storing the added counts, for instance, in case the added counts should not count toward the performance data. An example of such counts would be when a processor executes instructions based on anticipated future execution flow, that is, the execution is speculative. If the anticipated future execution flow results in incorrect or unnecessary execution, the performance counts resulting from those executions should not be counted.

Figure 6:
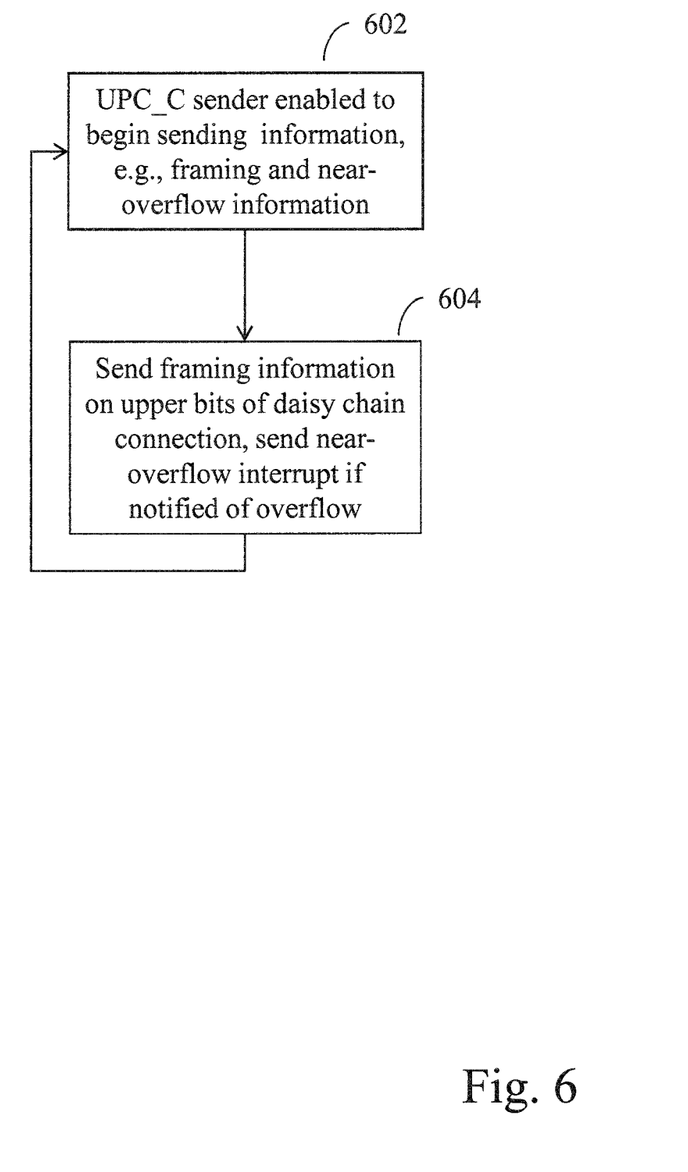
FIGS. 6, 7 and 8 are flow high-level overview diagrams that illustrate a method for distributed performance counters in one embodiment of the present disclosure.
Figure 7:
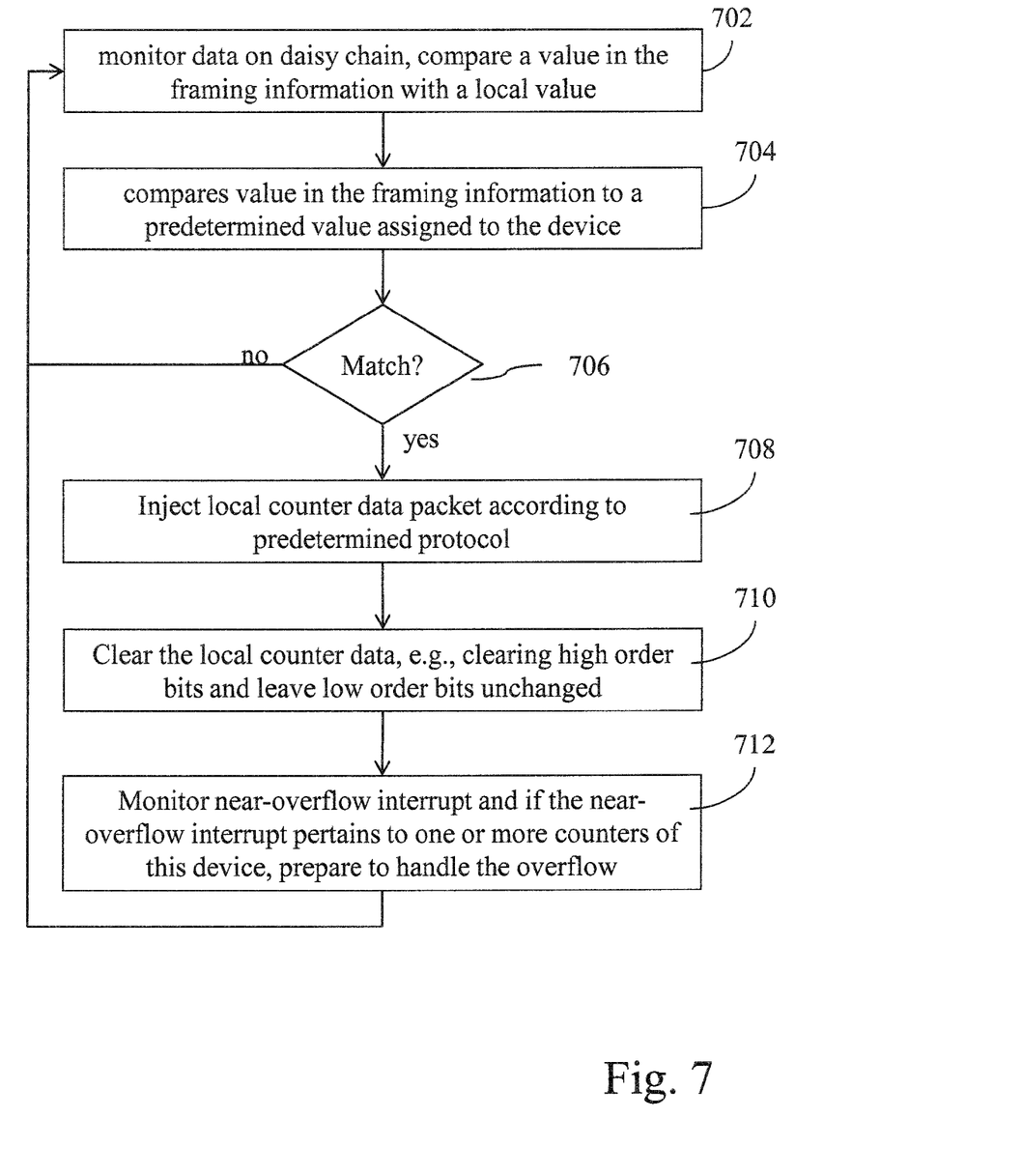
Figure 8:
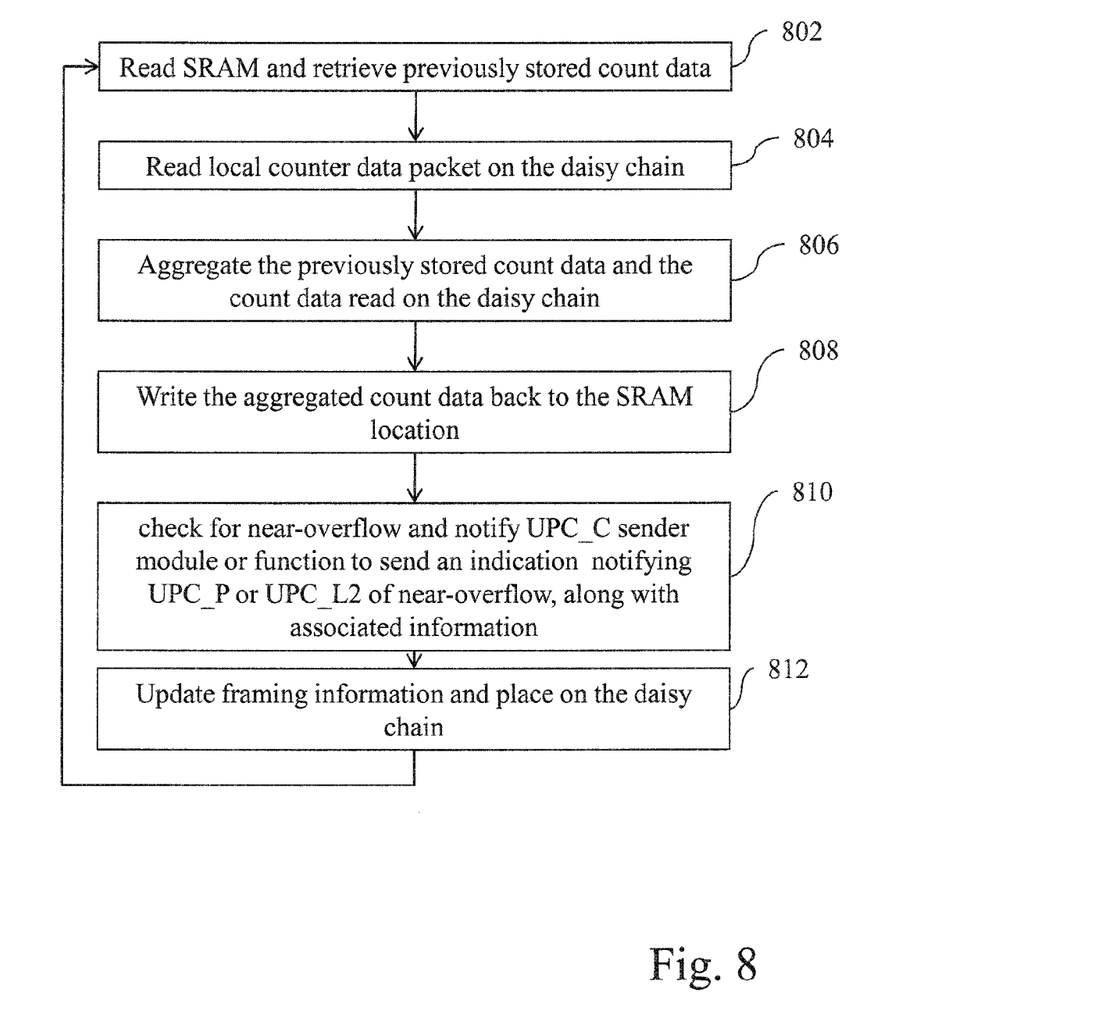

FIGS. 6, 7 and 8 are flow high-level overview diagrams that illustrate a method for distributed performance counters in one embodiment of the present disclosure. Before the steps taken in those figures, a set up of the performance counters may take place. For instance, initial values of counters may be loaded, operating mode (e.g., distributed mode (Mode 0), detailed mode (Mode 1), or trace mode (Mode 2) may be programmed, and events may be selected for counting. Additionally, during the operations of the local and central performance counters of the present disclosure, one or more of those parameters may be reprogrammed, for instance, to change the mode of operation and others. The set up and reprogramming may have been performed by user software writing into appropriate registers as described above.

FIG. 6 is a flow diagram illustrating central performance counter unit sending the data on the daisy chain bus. At 602, a central performance counter unit (e.g., UPC_C described above), for example, its UPC_C sender module or functionality is enabled to begin sending information, for example, framing and near-overflow information where applicable, for example, by software. At 604, the central performance counter unit sends framing information on a daisy chain connection. The framing information may be placed on upper bits of the connection, e.g., upper 32 bits of a 96 bit bus connection. The framing information may include clock cycle count for indicating to the local performance counter modules (e.g., UPC_P and UPC_L2 described above), which of the local performance counter modules should transfer their data. An example format of the framing information is shown in Table 1-4 above. Other format may be used for controlling the data transfer from the local performance counters. In addition, if it is determined that a near-overflow indication should be sent, the UPC_C also sends the indication. Determination of the near-overflow is made, for instance, by the UPC_C's receiving functionality that checks whether the overflow is about to occur in the SRAM location after aggregating the received data with the SRAM data as will be described below.

FIG. 7 is a flow diagram illustrating functions of a local performance counter module (e.g., UPC_P and UPC_L2) receiving and sending data on the daisy chain bus. At 702, a local performance counter module (e.g., UPC_P or UPC_L2) monitors (or reads) the framing information produced by the central performance counter unit (e.g., UPC_C). At 704, the local performance counter module compares a value in the framing information to a predetermined value assigned or associated with the local performance counter module. If the values match at 706, the local performance counter module places its counter data onto the daisy chain 708. For example, as described above, the UPC_C may transmit a repeating cycle count, ranging from 0 to 399 decimal. Each UPC_P and UPC_L2 compares this count to a value based on its logical unit number, and injects its packet onto the daisy chain when the cycle count matches the value for the given unit. Example values compared by each unit are shown in Table 1-5. Other values may be used for this functionality. If, on the other hand, there is no match at 706, the module returns to 702. At 710, the local counter data is cleared. In one aspect, UPC_P may clear only the upper bit of the performance counter, leaving the lower bits intact.

At the same time or substantially the same time, the local performance counter module also monitors for near-overflow interrupt from the UPC_C at 712. If there is an interrupt, the local performance counter module may retrieve the information associated with the interrupt from the daisy chain bus and determine whether the interrupt is for any one of its performance counters. For example, the SRAM location specified on the daisy chain associated with the interrupt is checked to determine whether that location is where the data of its performance counters are stored. If the interrupt is for any one of its performance counters, the local performance counter module arms the counter to handle the near-overflow. If a subsequent overflow of the counter in UPC_P or UPC_L2 occurs, the UPC_P or UPC_L2 may optionally freeze the bits in the specified performance counter, as well as generate an interrupt.

FIG. 8 is a flow diagram illustrating the UPC_C receiving the data on the daisy chain bus. At 802, the central performance counter module (e.g., UPC_C) reads the previously stored count data (e.g., in SRAM) associated with the performance counter whose count data is incoming on the daisy chain bus. At 804, the central performance counter module receives the incoming counter data (e.g., the data injected by the local performance counters), and at 806, adds the counter data to the corresponding appropriate count read from the SRAM. At 808, the aggregated count data is stored in its appropriate addressable memory, e.g., SRAM. At 810, the central performance counter module also may check whether an overflow is about to occur in the received counter data and notifies or flags to send a near-overflow interrupt and associated information on the daisy chain bus, specifying the appropriate performance counter module for example, by its storage location or address in the memory (SRAM). At 812, the central performance counter module updates the framing information, for example, increments the cycle count, and sends the updated framing information on the daisy chain to repeat the processing at 802. Interrupt handling is described, for example, in U.S. Patent Publication No. 2008/0046700 filed Aug. 21, 2006 and entitled "Method and Apparatus for Efficient Performance Monitoring of a Large Number of Simultaneous Events", which is incorporate herein in its entirety by reference thereto.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A distributed performance counter device, comprising:
a plurality of first performance counter modules coupled to a plurality of processing cores, the plurality of first performance counter modules operable to collect performance data associated with the plurality of processing cores respectively;
a plurality of second performance counter modules coupled to a plurality of L2 cache units, the plurality of second performance counter modules operable to collect performance data associated with the plurality of L2 cache units respectively; and
a central performance counter module operable to coordinate counter data from the plurality of first performance counter modules and the plurality of second performance modules,
wherein the central performance counter module, the plurality of first performance counter modules, and the plurality of second performance counter modules are connected by a daisy chain connection, and the plurality of first performance counter modules, and the plurality of second performance counter modules place respective count data on the daisy chain connection every predetermined cycle for transferring the count data to the central performance counter module for central storage,
the central performance counter module aggregating the respective count data into higher resolution count for each of the first performance counter modules and the second performance counter modules,
the predetermined cycle determined based on at least a number of performance counters per each of the first performance counter modules and the second performance counter modules, a number of the first performance counter modules and the second performance counter modules connected on the daisy chain connection, and a number of bits that can be transferred at one time on the daisy chain connection,
wherein the central storage of the central performance counter module is configured to operate in multiple modes, the multiple modes comprising at least a distributed mode, in which each of the first performance counter modules and the second performance counter modules provides counts to the central storage, and a detailed mode, in which a single processing core or a single L2 cache unit provides counts to the central storage,
wherein the central performance counter module injects framing information on the daisy chain connection for each of the first performance counter modules and the second performance counter modules to use in placing the count data on the daisy chain connection,
wherein the central performance counter module further places a near-overflow interrupt on the daisy chain connection for one or more of the first performance counter modules and the second performance counter modules to receive and handle.

2. The device of claim 1, wherein the plurality of first performance counter modules, and the plurality of second performance counter modules are connected via a single daisy chain bus.

3. The device of claim 2, wherein start and end of the daisy chain bus is at the central performance counter module.

4. The device of claim 1, wherein the central performance counter module includes an addressable memory for storing counter data received from the plurality of first performance counter modules, the plurality of second counter performance modules, or combinations thereof.

5. The device of claim 1, wherein the plurality of the plurality of first performance counter modules and the plurality of second performance counter modules transfer counter data to the central performance counter module before overflow of the plurality of first performance counter modules or the plurality of second performance counter modules occurs.

6. The device of claim 1, wherein the plurality of the plurality of first performance counter modules and the plurality of second performance counter modules transfer counter data to the central performance counter module at an interval specified by the central performance counter module via the daisy chain connection.

7. The device of claim 1, wherein the plurality of the plurality of first performance counter modules and the plurality of second performance counter modules transfer counter data to the central performance counter module via the daisy chain connection by placing a predetermined number of counter data at a time on the daisy chain connection.

8. The device of claim 1, wherein the counter data is transferred using a predefined packet protocol.

9. The device of claim 1, wherein the plurality of the plurality of first performance counter modules and the plurality of second performance counter modules places local counter data at a specific time specified by framing information received from the central performance counter module on upper bits of the daisy chain connection.

10. The device of claim 1, wherein the plurality of the plurality of first performance counter modules and the plurality of second performance counter modules places local counter data on lower bits of the daisy chain connection at a specific time specified by framing information received from the central performance counter module on upper bits of the daisy chain connection.

11. The device of claim 1, where the central performance counter module collects counter data from a selected one of the plurality of first performance counter modules and the plurality of second performance counter modules, wherein all of lower bits of the daisy chain connection are used for counter data associated with the selected one of the plurality of first performance counter modules and the plurality of second performance counter modules.

12. The device of claim 11, wherein the counter data includes performance information from a core, trace, and L1 unit of the selected one of the plurality of first performance counter modules and the plurality of second performance counter modules.

13. The device of claim 1, wherein the counter data includes trace information from a core residing in one of the plurality of processing cores and associated L1 cache units.

14. A method for distributed performance counters, comprising:
    collecting local counter data information by a plurality of performance counters residing locally with respective plurality of processing units and L2 cache units;
    placing on lower bits of a daisy chain bus, the collected local counter data information by each of the plurality of performance counters at a predetermined interval of time specified on upper bits of the daisy chain bus;
    storing by a central performance counter module, the local counter data information placed on the lower bits of the daisy chain bus; and
    aggregating, by the central performance counter module, the collected local counter data information into higher resolution count for each of the performance counters,
    the predetermined interval of time determined based on at least a number of the plurality of performance counters residing locally with respective plurality of processing units and L2 cache units connected on the daisy chain bus, and a number of bits that can be transferred at one time on the daisy chain bus,
    wherein a central storage of the central performance counter module is configured to operate in multiple modes, the multiple modes comprising at least a distributed mode, in which each of the plurality of performance counters provides local counter data information to the central storage, and a detailed mode, in which a single processing unit or a single L2 cache unit provides local counter data information to the central storage,
    wherein the central performance counter module injects framing information on the daisy chain bus for each of the plurality of performance counters to use in placing the local counter data information on the daisy chain bus,
    wherein the central performance counter module further places a near-overflow interrupt on the daisy chain bus for one or more of the plurality of performance counters to receive and handle.

15. The method of claim 14, wherein the storing includes storing to an addressable memory, by a central performance counter module, the local counter data information placed on the lower bits of the daisy chain bus.

16. The method of claim 15, wherein the addressable memory includes SRAM.

17. The method of claim 14, wherein the step of placing includes placing on lower bits of a daisy chain bus, the collected local counter data information of a selected event by the plurality of performance counters at a predetermined interval of time specified on upper bits of the daisy chain bus.

18. A computer readable storage medium, excluding signal per se storing a program of instructions executable by a machine to perform a method of distributed performance counters, the method comprising:
    collecting local counter data information by a plurality of performance counters residing locally with respective plurality of processing units and L2 cache units;
    placing on lower bits of a daisy chain bus, the collected local counter data information by each of the plurality of performance counters at a predetermined interval of time specified on upper bits of the daisy chain bus;
    storing by a central performance counter module, the local counter data information placed on the lower bits of the daisy chain bus; and
    aggregating, by the central performance counter module, the collected local counter data information into higher resolution count for each of the performance counters,
    the predetermined interval of time determined based on at least a number of the plurality of performance counters residing locally with respective plurality of processing units and L2 cache units connected on the daisy chain bus, and a number of bits that can be transferred at one time on the daisy chain bus,
    wherein a central storage of the central performance counter module is configured to operate in multiple modes, the multiple modes comprising at least a distributed mode, in which each of the plurality of performance counters provides local counter data information to the central storage, and a detailed mode, in which a single processing unit or a single L2 cache unit provides local counter data information to the central storage,
    wherein the central performance counter module injects framing information on the daisy chain bus for each of the plurality of performance counters to use in placing the local counter data information on the daisy chain bus,
wherein the central performance counter module further places a near-overflow interrupt on the daisy chain bus for one or more of the plurality of performance counters to receive and handle.

19. The computer readable storage medium of claim 18, wherein the storing includes storing to an addressable memory, by a central performance counter module, the local counter data information placed on the lower bits of the daisy chain bus.

20. The computer readable storage medium of claim 18, wherein the step of placing includes placing on lower bits of a daisy chain bus, the collected local counter data information of a selected event by the plurality of performance counters at a predetermined interval of time specified on upper bits of the daisy chain bus.

* * * * *